United States Patent
Zhamu et al.

(10) Patent No.: US 9,926,427 B2
(45) Date of Patent: Mar. 27, 2018

(54) CHEMICAL-FREE PRODUCTION OF GRAPHENE-REINFORCED POLYMER MATRIX COMPOSITES

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 14/757,236

(22) Filed: Dec. 10, 2015

(65) Prior Publication Data

US 2017/0166722 A1 Jun. 15, 2017

(51) Int. Cl.
| | | |
|---|---|---|
| C08K 3/04 | (2006.01) | |
| C01B 32/19 | (2017.01) | |
| B05D 1/02 | (2006.01) | |
| B29C 70/58 | (2006.01) | |
| B33Y 10/00 | (2015.01) | |
| B29C 45/00 | (2006.01) | |
| B02C 17/04 | (2006.01) | |
| B29K 105/16 | (2006.01) | |
| B29K 507/04 | (2006.01) | |

(52) U.S. Cl.
CPC .............. C08K 3/04 (2013.01); B05D 1/02 (2013.01); B29C 70/58 (2013.01); C01B 32/19 (2017.08); *B29K 2105/16* (2013.01); *B29K 2507/04* (2013.01); *B33Y 10/00* (2014.12)

(58) Field of Classification Search
CPC .. C08K 3/04; B02C 17/04; B05D 1/02; B29C 45/0013; B29C 70/58; B33Y 10/00; B29K 2105/16; B29K 2507/04; C01B 32/19
USPC ........................................................ 524/534
See application file for complete search history.

(56) References Cited

U.S. PATENT DOCUMENTS

| | | | |
|---|---|---|---|
| 6,872,330 B2 | 3/2005 | Mack et al. | |
| 7,071,258 B1 | 7/2006 | Jang et al. | |
| 7,327,000 B2 | 2/2008 | DeHeer et al. | |
| 7,824,651 B2 | 11/2010 | Zhamu et al. | |
| 7,883,995 B2 * | 2/2011 | Mitchell | B22F 1/0018 438/478 |
| 7,906,053 B1 * | 3/2011 | Torkelson et al. | B29K 47/40 264/211 |
| 2012/0142832 A1 * | 6/2012 | Varma | C09D 5/24 524/145 |
| 2013/0087446 A1 * | 4/2013 | Zhamu | B82Y 40/00 204/157.43 |
| 2015/0239741 A1 * | 8/2015 | Burton | C08G 65/321 525/327.3 |

FOREIGN PATENT DOCUMENTS

| | | | | |
|---|---|---|---|---|
| CN | 102586952 | | 7/2012 | |
| CN | 102586952 A | * | 7/2012 | .............. D01F 9/22 |
| CN | 103301936 | | 9/2013 | |
| CN | 103301936 A | * | 9/2013 | .............. B03C 1/14 |
| CN | 103724869 | | 4/2014 | |
| CN | 103724869 A | * | 4/2014 | .............. C08L 27/04 |
| WO | 20142010584 | | 12/2014 | |
| WO | WO 2014210584 A1 | * | 12/2014 | .............. H01B 1/04 |
| WO | 2014210584 A1 | | 7/2015 | |

OTHER PUBLICATIONS

Malpass et al., Introduction to Industrial Polypropylene, Wiley, 2012, Chapter 1.2, Figure 1.3 (Year: 2012).*
Wang et al., "Preparation of expanded graphite/poly (phenylene sulfide) composites with high thermal and electrical conductivity by rotating solid-state premixing and melt processing", J. Mater. Sci (2013) 48:1932-1939.*
Li et al., "Forced assembly by multilayer coextrusion to create oriented graphene reinforced polymer nanocomposites", Polymer, vol. 55, No. 1, pp. 248-257, Jan. 2014.*
Wang, J., Wu, M., Li, Y. et al. "Preparation of expanded graphite/ poly (phenylene sulfide) composites with high thermal and electrical conductivity by rotating solid-state premixing and melt processing", J Mater Sci (2013) 48: 1932. doi:10.1007/s10853-012-6958-1.
Li, Xiguang, et al. "Forced assembly by multilayer coextrusion to create oriented graphene reinforced polymer nanocomposites." Polymer 55.1 (2014): 248-257.
PCT/US16/65336 International Search Report and Written Opinion dated Feb. 8, 2017, 13 pages.
Li et al., "Forced assembly by multilayer coextrusion to create oriented graphene reinforced polymer nanocomposites" Polymer (2014) vol. 55, No. 1, pp. 248-257.

(Continued)

*Primary Examiner* — Ling Choi
*Assistant Examiner* — Ronald Grinsted

(57) ABSTRACT

Provided is a simple, fast, scalable, and environmentally benign method of producing a graphene-reinforced polymer matrix composite directly from a graphitic material, the method comprising: (a) mixing multiple particles of a graphitic material and multiple particles of a solid polymer carrier material to form a mixture in an impacting chamber of an energy impacting apparatus; (b) operating the energy impacting apparatus with a frequency and an intensity for a length of time sufficient for peeling off graphene sheets from the graphitic material and transferring the graphene sheets to surfaces of solid polymer carrier material particles to produce graphene-coated or graphene-embedded polymer particles inside the impacting chamber; and (c) forming graphene-coated or graphene-embedded polymer particles into the graphene-reinforced polymer matrix composite. Also provided is a mass of the graphene-coated or graphene-embedded polymer particles produced by this method.

26 Claims, 9 Drawing Sheets

(56) References Cited

OTHER PUBLICATIONS

Wang et al., "Preparation of expanded graphite/poly (phenylene sulfide) composites with high thermal and electrical conductivity by rotating solid-state premixing and melt processing" Journal of Material Science (2012) vol. 48, pp. 1932-1939.
CN102586952A, English language translation from https://app.patseer.com, 11 pages.
CN103301936A, English language translation from https://app.patseer.com, 7 pages.
CN103724869A, English language translation from https://app.patseer.com, 16 pages.

* cited by examiner

US 9,926,427 B2

CHEMICAL-FREE PRODUCTION OF GRAPHENE-REINFORCED POLYMER MATRIX COMPOSITES

FIELD OF THE INVENTION

The present invention relates to the art of graphene materials and, in particular, to an environmentally benign and cost-effective method of producing graphene-reinforced polymer matrix composites.

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for chemical-free production of isolated nano graphene platelets that is novel in that is does not follow the established methods for production of nano graphene platelets outlined below. In addition, the process is of enhanced utility in that it is cost effective, and provided novel graphene materials with significantly reduced environmental impact. Four main prior-art approaches have been followed to produce NGPs. Their advantages and shortcomings are briefly summarized as follows:

Production of Isolated Graphene Sheets

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.
(4) The thermal exfoliation requires a high temperature (typically 800-1,200° C.) and, hence, is a highly energy-intensive process.
(5) Both heat- and solution-induced exfoliation approaches require a very tedious washing and purification step. For instance, typically 2.5 kg of water is used to wash and recover 1 gram of GIC, producing huge quantities of waste water that need to be properly treated.
(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations outlined above.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications. The present invention was made to overcome the limitations outlined above.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets. The present invention was made to overcome the limitations outlined above.

Hence, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets. These graphene sheets are particularly effective in reinforcing polymer matrix materials.

Applications and Importance of Graphene Polymer Nanocomposites

Potential applications of graphene reinforced polymer matrix composites (also hereinafter referred to as graphene-polymer nanocomposites or simply graphene nanocomposites) take advantage of 4 major areas of property enhancement: electrical conductivity, thermal conductivity, mechanical properties, and barrier properties. Examples of specific applications include tires, electronic housings, EMI shielding, fuel lines, sensors, UV resistant polymer articles and flexible circuits. Graphene nanocomposites provide a major opportunity for weight reduction in automotive and aircraft body panels.

In the instant specification, NGPs or graphene sheets can refer to pristine graphene, graphene oxide (GO), reduced graphene oxide (RGO), graphene fluoride, and chemically functionalized graphene. Four main prior-art approaches have been followed to produce graphene/polymer and graphene oxide/polymer nanocomposites. Their advantages and shortcomings are briefly summarized as follows:

Approach 1: In Situ Polymerization to Produce Polymer/Graphene Nanocomposites

Small-scale production of well dispersed polymer/graphene and polymer/graphene oxide nanocomposites can be produced via in situ polymerization, as shown in FIG. 3 [Lopez-Manchado et al, "Graphene Filled Polymer Nanocomposites", J. Mater. Chem. Vol. 21 Issue 10, pp. 3301-3310]. In the most common method, graphite or graphene platelets (9) are added to a solution of monomer or monomers. Shear forces or ultrasonic energy are applied, and the monomer is polymerized. This creates a polymer/graphene solution or polymer/graphite intercalation compound solution. Solvent is removed or a non-solvent is added, resulting in solid particles of polymer wrapped graphene or polymer/graphite intercalation compound. The material is processed by melt compounding, pressing or sintering, creating a polymer/graphene nanocomposite. Similarly, graphene oxide can be processed through in situ polymerization, creating a polymer/graphene oxide solution which can be reduced to create polymer wrapped graphene solution or further processed by solvent removal to create polymer wrapped graphene oxide. This is then processed via melt compounding or other methods known in the art to create a polymer/graphene oxide composite.

In situ polymerization produces a very well dispersed polymer/graphene or polymer/graphene oxide nanocomposite. However, this method has significant disadvantages that make scale up to industrial scale production challenging.

1) Many monomers required in the in situ polymerization have adverse health effects, safety risks, adverse environmental impact, or some combination of the above.
2) Solvent usage required in situ polymerization is a significant cost for production scale up. Solvent recovery equipment for industrial scale production represents significant energy and equipment costs.

3) Poor compatibility of the monomers with graphene or graphene oxide results in a low quality dispersion.
4) The use of graphene oxide creates process chemistry challenges. Graphene oxide can covalently bond with many monomers, which is sometimes desirable. However, the oxygen content of graphene oxide can vary based on process conditions, storage conditions and material supplier. The inherent variability of the input material is problematic for industrial scale production.

The present invention was made to overcome the limitations outlined above.

Approach 2: Solution Mixing to Produce Polymer/Graphene Nanocomposites

Small-scale production of well dispersed polymer/graphene and polymer/graphene oxide nanocomposites can be produced via solution mixing, as shown in FIG. 4. [Lopez-Manchado et al, "Graphene Filled Polymer Nanocomposites", J. Mater. Chem. Vol. 21 Issue 10, pp. 3301-3310]. In the most common method a solvent suspension of graphene platelets is created by shearing, cavitation or application of ultrasound energy. The solvent chosen must suitable for the selected polymer. The polymer is added to solvent solution, and energy is applied by shear or ultrasound to create a graphene/polymer solution. The solvent is then removed, commonly by filtration, evaporation or a combination, creating polymer wrapped graphene particles. The particles are then melt compounded, pressed or sintered to create a polymer/graphene composite. Alternately, an anti-solvent can be added to the polymer/graphene solution to cause precipitation of polymer wrapped graphene. This material may require filtration, washing and drying before further processing.

The solution mixing technique can also be carried out with graphene oxide (GO) platelets in a colloidal solvent suspension. Following a similar process to that used for the solvent suspension of graphene platelets, addition of a polymer creates a polymer/graphene oxide solution. That solution can be reduced by chemical, thermal, light or electrolytic methods commonly known in the art, creating a polymer/graphene solution. Alternately, the polymer/graphene oxide solution can be processed by removing solvent or adding anti-solvent to create polymer wrapped graphene oxide. The polymer wrapped graphene oxide can be reduced to create polymer wrapped graphene or processed by melt compounding or other methods to create a polymer/graphene oxide nanocomposite. This nanocomposite can be the final product or can be reduced by commonly known means to create a polymer/graphene nanocomposite. Because of the thermal instability of graphene oxide, a polymer/graphene oxide nanocomposite can only be created with polymers having a process temperature less than 100-150° C.

The solution mixing process is advantageous in allowing the creation of finely dispersed polymer/graphene nanocomposites. It also facilitates high loading levels of graphene. However, this process has several major limitations:
1) Dissolution of polymers requires significant energy input via shear or ultrasound, even for well-matched polymer/solvent systems such as ABS/acetone. Use of higher cost powdered polymers or reactor spheres can reduce but not eliminate the need for this process step.
2) Many solvents required for polymer dissolution have adverse health effects, safety risks, adverse environmental impact, or some combination of the above. In addition to acetone, common solvents for polymers include methyl ethyl ketone, hexane, toluene, and xylene.
3) Solvent usage required for solution mixing is a significant cost for production scale up. For example, production of 1 kg of ABS could require 10 kg or more of acetone. Solvent recovery equipment for industrial scale production by solution mixing represents significant energy and equipment costs.
4) Some polymers, for example polyimide and PEEK, are poorly soluble or insoluble in known solvents. Additionally, the solvent must be selected such that the graphene or graphene oxide can be dispersed in it. Poor compatibility of the solvent with graphene or graphene oxide results in a low quality dispersion.

Alternative methods to remove solvent from a solution mixed polymer are spray drying and film casting. Or, the polymer/graphene mixture can be directly sprayed onto the final coated surface. These methods all share the disadvantages of solvent cost, solvent safety and costly solvent recovery. The present invention was made to overcome the limitations outlined above.

Approach 3: Dry Blending to Produce Polymer/Graphene Nanocomposites

Small-scale production of well dispersed polymer/graphene and polymer/graphene oxide nanocomposites can be produced by dry blending, as shown in FIG. 5. [Lopez-Manchado et al, "Graphene Filled Polymer Nanocomposites", J. Mater. Chem. Vol. 21 Issue 10, pp. 3301-3310]. In the most common method, graphene platelets are added to a mixing device containing polymer pellets. An additive may be included to aid in adhesion of graphene to the polymer pellets. After operation of the mixing device, polymer pellets loosely coated with graphene are fed into a melt compounder to create a polymer/graphene nanocomposite. Alternately, graphene oxide can be sprayed onto polymer pellets, creating GO coated polymer pellets. These can be melt compounded at a low temperature to create a polymer/graphene oxide nanocomposite. Alternately, they can be reduced via one of several methods, and then melt compounded to create a polymer/graphene nanocomposite.

Dry blending followed by melt compounding is the most scalable of the commonly used methods to create polymer/graphene composites. Solvents and monomers are not required, reducing health, safety and environmental risks. However, this method has several major disadvantages impacting industrial scale up.
1) Input materials cost: The cost of raw materials for both graphene and polymer is a substantial disadvantage. The quality of dispersion is strongly affected by particle size of the polymer pellets. Commodity polymer pellets are commonly rough cylinders 2-3 mm in diameter and 2-5 mm in length. With conventional polymer pellets, the maximum loading achievable is about 5% nano graphene platelets. Use of high surface area reactor powder or ground polymer powder can increase the available surface area for dispersion, however this significantly increases input materials costs.
2) Uncertainty of graphene loading: Because graphene powder is loosely adhered to the polymer carrier, an unknown amount of the material may be lost during transfer to melt compounding. This results in uncertainty of the actual loading level of graphene, as well as unnecessary dust exposure to the operator.
3) Limitation to maximum graphene loading level: Solid state mixing is limited to the amount of material that can be loosely adhered to the polymer surface by electrostatic forces or by an adhesion aid. This is limited to about 50% for nano graphene platelets with a thickness of about 10 nm, and about 2 percent for high surface area, few layer graphene. One way around the maximum loading limitation is to melt compound, pelletize, and re-coat with graphene, followed by additional melt compounding. Repeated melt compounding is undesirable due to thermal and mechanical degradation of the polymer matrix.

The present invention was made to overcome the limitations outlined above.

Approach 4: Solid State Shear Pulverization to Produce Polymer/Graphene Nanocomposites Small-scale production of well dispersed polymer/graphene and polymer/graphene oxide nanocomposites can be produced via solid state shear pulverization (SSSP) [Torkelson, et al "Polymer-graphite nanocomposites via solid state shear pulverization" U.S. Pat. No. 8,303,876 (Nov. 6, 2012)]. In the most common method, graphite material is mixed with polymer pellets and added to a melt compounding device. Pulverization, kneading and mixing elements are used to break down the graphite into graphene dispersed in a polymer matrix. This method has several major challenges impacting industrial scale up.

1) Thermal degradation and heat history of the polymer matrix: It is well known to those skilled in the art that aggressive, high temperature or extended time melt compounding of polymers causes reduced mechanical strength. SSSP to create well dispersed graphene is expected to cause degradation of mechanical properties and even temperature induced color changes in the polymer matrix.

2) Wear of melt compounding equipment: The use of a melt compounder to knead, mix and pulverize graphite is expected to cause significant wear to the screw elements. Replacement of screw elements causes equipment down time and significant expenses. Because of screw element wear, the process may change over time, creating an undesirable decrease in the quality of dispersion.

3) Energy and water usage: SSSP requires cooling to dissipate heat generated by exfoliation of graphite to create graphene.

4) Limitations of particle size: graphite must be reduced below a certain particle size to be processed via SSSP. This is a cost and energy intensive process.

The present invention was made to overcome the limitations outlined above.

SUMMARY OF THE INVENTION

The present invention provides a strikingly simple, fast, scalable, environmentally benign, and cost-effective method of producing graphene-reinforced polymer matrix composites. This method meets the aforementioned needs. This method entails producing single-layer or few layer graphene sheets directly from a graphitic or carbonaceous material (a graphene source material) and immediately transferring these graphene sheets onto surfaces of polymer particles (herein referred to as solid carrier material particles) to form graphene-coated or graphene-embedded solid polymer particles. The graphene-coated polymer particles are then consolidated into a composite material of a desired shape via, for instance, melting and then solidification, dissolving in a solvent and then removing the solvent, sintering, etc.

The mass of graphene-coated or graphene-embedded solid polymer particles can be sold as a separate product. In these graphene-coated or graphene-embedded particles, the graphene proportion is typically from 0.01% to 80% by weight based on the total weight of graphene and polymer combined This product can replace the conventional masterbatch in which fillers are dispersed in a polymer matrix and the mixture is made into a pellet form. The masterbatch can be mixed with a polymer at any practical proportion to form a blend and then extruded or injection-molded, for instance. It may be noted that it has been difficult to disperse more than 25% of graphene in a polymer matrix by using the conventional approaches.

The polymer particles may be selected from a thermoplastic (e.g. PE, PP, nylon, ABS, engineering plastics, etc.), thermosetting (e.g. curable by heat, UV light, radiation, electron beam, curing agent, etc.), rubber, semi-penetrating network polymer, penetrating network polymer, or a combination thereof.

In a preferred embodiment, this method comprises subjecting a mixture of graphitic material, particles of a polymer-based solid carrier material, and, optionally, impacting balls to mechanical agitation via a ball mill or a similar energy impacting device for a length of time sufficient for peeling off graphene layers (planes of hexagonally arranged carbon atoms) from the source graphite material, and coating these peeled-off graphene layers onto surfaces of the solid polymer carrier material particles. With the presence of impacting balls, graphene sheets can be peeled off from the source graphite particles and tentatively deposited onto the surfaces of impacting balls. When these graphene sheet-coated impacting balls subsequently impinge upon solid carrier particles, the graphene sheets are transferred to surfaces of carrier particles to produce graphene-coated polymer particles. In some embodiments, graphene sheets may be embedded into the carrier particles. Subsequently, the graphene-coated polymer particles are formed into a graphene-reinforced polymer matrix composite.

In certain embodiments, a plurality of impacting balls or media are added to the impacting chamber of the energy impacting apparatus if the solid polymer carriers are not sufficiently hard and rigid. In a preferred embodiment, a magnet is used to separate the impacting balls or media from the graphene-coated polymer particles prior to step of forming the graphene-coated polymer particles into the graphene-reinforced polymer matrix composite.

Preferably, the starting material (graphitic or carbonaceous material as a graphene source material) has never been previously intercalated or chemically oxidized. This starting material is not a graphite intercalation compound (GIC) or graphite oxide (GO). Preferably, the source graphitic material is selected from natural graphite, synthetic graphite, highly oriented pyrolytic graphite, meso-carbon micro-bead, graphite fiber, graphitic nano-fiber, graphite oxide, graphite fluoride, chemically modified graphite, exfoliated graphite, vein graphite, or a combination thereof.

In some embodiments, the impacting chamber of the energy impacting apparatus further contains a protective fluid; e.g. inert gas, non-reactive liquid, water, etc.

This process is of low cost and highly scalable. In less than 2 hours of process time (less than 20 minutes in many cases), graphene sheets are peeled off from graphite particles and re-deposited onto surfaces of polymer particles. The resulting graphene-coated polymer particles can be fed into an extruder or an injection molding material for directly producing graphene-reinforced polymer composite parts. In a period of 20 minutes-2 hours one could produce graphene-polymer nanocomposite components directly from a source graphite material. This process is stunningly fast and simple, considering the notion that the production of graphene sheets from graphite by using most of the known processes would take 4-120 hours just for intercalation and oxidation, plus times for repeated rinsing and drying, and subsequent thermal exfoliation. Furthermore, the dispersion of graphene sheets in a polymer matrix is also known to be a highly challenging task. The present invention combines the graphene production, graphene-polymer mixing (graphene dispersion), and composite processing into a single operation.

A preferred embodiment of the present invention is a method of directly mixing a graphitic material and a carrier material into an energy impacting device, such as a ball mill, and submitting the mixture to a sufficiently long treatment time to peel off graphene layers from the source graphitic material and transfer these graphene layers immediately to the carrier material surfaces. These graphene sheets are typically single-layer or few-layer graphene sheets (typically <5 layers; mostly single-layer graphene). Following this step, the graphene-coated polymer particles are formed into a composite shape using a broad array of composite processing techniques.

For instance, this step of composite forming can include melting the polymer particles to form a mixture of polymer melt and graphene sheets dispersed therein, forming the polymer melt-graphene mixture into a desired shape and solidifying the shape into the graphene-reinforced polymer matrix composite. In certain embodiments, the process includes melting the polymer particles to form a polymer melt mixture with graphene sheets dispersed therein and subsequently extruding the mixture into a rod form or sheet form, spinning the mixture into a fiber form, spraying the mixture into a powder form, or casting the mixture into an ingot form.

Alternatively, the composite forming step can include dissolving the polymer particles in a solvent to form a polymer solution mixture with graphene sheets dispersed therein, forming the polymer solution mixture into a desired shape, and removing solvent to solidify the shape into the graphene-reinforced polymer matrix composite. In certain embodiments, the process includes dissolving the polymer particles in a solvent to form a polymer solution mixture with graphene sheets dispersed therein and extruding the solution mixture into a rod form or sheet form, spinning the solution mixture into a fiber form, spraying the solution mixture into a powder form, or casting the solution mixture into an ingot form, and then removing the solvent.

In a desired embodiment, the polymer solution mixture is sprayed to create a nano graphene reinforced polymer matrix composite coating or paint composition.

In an embodiment, the composite forming step includes sintering the graphene-coated polymer particles into a desired shape of the graphene-reinforced polymer matrix composite.

It may be noted that the graphene production step per se (peeling off graphene sheets directly from graphite particles and immediate or concurrent transfer of graphene sheets to polymer particle surfaces) is quite surprising, considering the fact that prior researchers and manufacturers have focused on more complex, time intensive and costly methods to create graphene in industrial quantities. In other words, it has been believed that chemical intercalation and oxidation is needed to produce bulk quantities of graphene platelets. The present invention defies this expectation in many ways:

(1) Unlike the chemical intercalation and oxidation (which requires expansion of inter-graphene spaces, further expansion or exfoliation of graphene planes, and full separation of exfoliated graphene sheets), the instant method directly removes graphene sheets from a source graphitic material and transfers these graphene sheets to surfaces of carrier material particles. No undesirable chemicals (e.g. sulfuric acid and nitric acid) are used.

(2) Unlike oxidation and intercalation, pristine graphene sheets can be transferred onto the carrier material. The sheets being free of oxidation damage allow the creation of graphene containing products with higher electrical and thermal conductivity.

(3) Unlike bottom up production methods, large continuous platelets can be produced with the instant method.

(4) Contrary to common production methods, strong acids and oxidizers are not needed to create the graphene coating.

(5) Contrary to common production methods, a washing process requiring substantial amounts of water is not needed.

Carrier materials can be in the form of polymer pellets, filament, fibers, powder, reactor spheres, or other forms.

The energy impacting apparatus may be selected from a ball mill, vibratory ball mill, planetary ball mill, high energy mill, basket mill, agitator ball mill, continuous ball mill, stirred ball mill, pressurized ball mill, vacuum ball mill, freezer (SPEX) mill, vibratory sieve, ultrasonic homogenizer mill, resonant acoustic mixer, or shaker table.

The presently invented process is capable of producing and dispersing single-layer graphene sheets. In many examples, the graphene material produced contains at least 80% single-layer graphene sheets. The graphene produced can contain pristine graphene, oxidized graphene with less than 5% oxygen content by weight, graphene fluoride with less than 5% fluorine by weight, graphene with a carbon content no less than 95% by weight, or functionalized graphene.

In certain embodiments, the impacting chamber further contains a modifier filler selected from a carbon fiber, ceramic fiber, glass fiber, carbon nanotube, carbon nanofiber, metal nano wire, metal particle, ceramic particle, glass powder, carbon particle, graphite particle, organic particle, or a combination thereof. The modifier filler can improve chemical, mechanical, and physical (electric, thermal, optical, and/or magnetic) properties of the resulting composites. For instance, the modifier filler is ferromagnetic or paramagnetic.

Another surprising and highly advantageous feature of the presently invented process is the notion that graphene sheet production and chemical functionalization can be accomplished concurrently in the same impacting chamber. The impact-induced kinetic energy experienced by the carrier particles are of sufficient energy and intensity to chemically activate the edges and surfaces of graphene sheets coated on carrier particle surfaces; e.g. creating highly active sites or free radicals). Desired functional groups can be imparted to graphene edges and/or surfaces, provided that selected chemical species (functionalizing agents) containing desired chemical function groups (e.g. —$NH_2$, Br—, etc.) are dispersed in the impacting chamber. Chemical functionalization reactions can occur in situ as soon as the reactive sites or active radicals are formed. Different functional groups are desired in different polymer matrix materials for the purpose of enhancing interfacial bonding between graphene sheets and a polymer matrix. For instance, —$NH_2$ groups are desirable in epoxy resin and polyimide matrix, and —COOH groups or —OH groups are useful in polyvinyl alcohol.

Thus, in some embodiments, step (b) of operating the energy impacting apparatus acts to chemically functionalize the produced graphene sheets with the functionalizing agent in the same impacting apparatus.

In some embodiments, functionalizing agents contain a chemical functional group selected from functional group is selected from alkyl or aryl silane, alkyl or aralkyl group, hydroxyl group, carboxyl group, amine group, sulfonate group (—SO$_3$H), aldehydic group, quinoidal, fluorocarbon, or a combination thereof.

Alternatively, the functionalizing agent contains an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

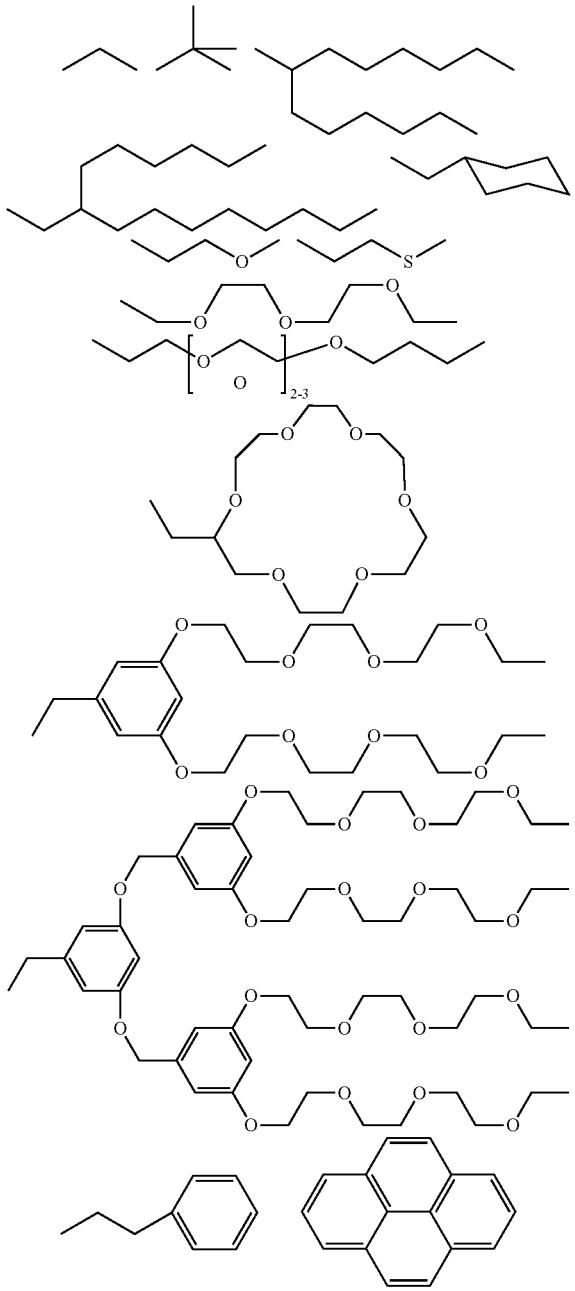

and combinations thereof.

In certain embodiments, the functionalizing agent contains an oxygenated group selected from the group consisting of hydroxyl, peroxide, ether, keto, and aldehyde. In certain embodiments, the functionalizing agent contains a functional group selected from the group consisting of SO$_3$H, COOH, NH$_2$, OH, R'CHOH, CHO, CN, COCl, halide, COSH, SH, COOR', SR', SiR'$_3$, Si(—OR'—)$_y$R'$_3$-y, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

The functionalizing agent may contain a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

In some embodiments, the functionalizing agent contains a functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(O—SiR'$_2$—)OR', R'—R", R'—N—CO, (C$_2$H$_4$O—)$_w$H, (C$_3$H$_6$O)$_w$H, (—C$_2$H$_4$O)$_w$—R', (C$_3$H$_6$O)$_w$—R', R', and w is an integer greater than one and less than 200.

The procedure of operating the energy impacting apparatus may be conducted in a continuous manner using a continuous energy impacting device. This process can be automated.

The composite forming step may be followed by heat-treating the graphene-reinforced polymer matrix composite to carbonize the polymer matrix or to carbonize and graphitize the polymer matrix at a temperature of 350° C. to 3000° C. to convert the graphene-reinforced polymer matrix composite into a graphene-reinforced carbon matrix composite or graphite matrix composite.

The present invention also provides a mass of graphene-coated or graphene-embedded polymer particles produced by the method without carrying out or prior to forming the graphene-coated or graphene-embedded particles into a composite part. In this mass, graphene proportion is from 0.01% to 80% by weight (more typically from 0.1% to 70% and further more typically from 1% to 60%) based on the total weight of graphene and polymer combined. The mass of graphene-coated or graphene-embedded polymer particles can be fed into an extruder, a molding machine, or a selective laser sintering apparatus to make a graphene-reinforced polymer composite part.

DETAILED DESCRIPTION OF PREFERRED EMBODIMENTS

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber.

One preferred specific embodiment of the present invention is a method of producing a nano graphene platelet (NGP) material and its polymer matrix composite. An NGP is essentially composed of a sheet of graphene plane (hexagonal lattice of carbon atoms) or multiple sheets of graphene plane stacked and bonded together (typically, on an average, less than five sheets per multi-layer platelet). Each graphene plane, also referred to as a graphene sheet or basal plane comprises a two-dimensional hexagonal structure of carbon atoms. Each platelet has a length and a width parallel to the graphite plane and a thickness orthogonal to the graphite plane. By definition, the thickness of an NGP is 100 nanometers (nm) or smaller, with a single-sheet NGP being as thin as 0.34 nm. However, the NGPs produced with the instant methods are mostly single-layer graphene with some few-layer graphene sheets (<5 layers). The length and width of a NGP are typically between 200 nm and 20 μm, but could be longer or shorter, depending upon the sizes of source graphite material particles.

Figure 2:
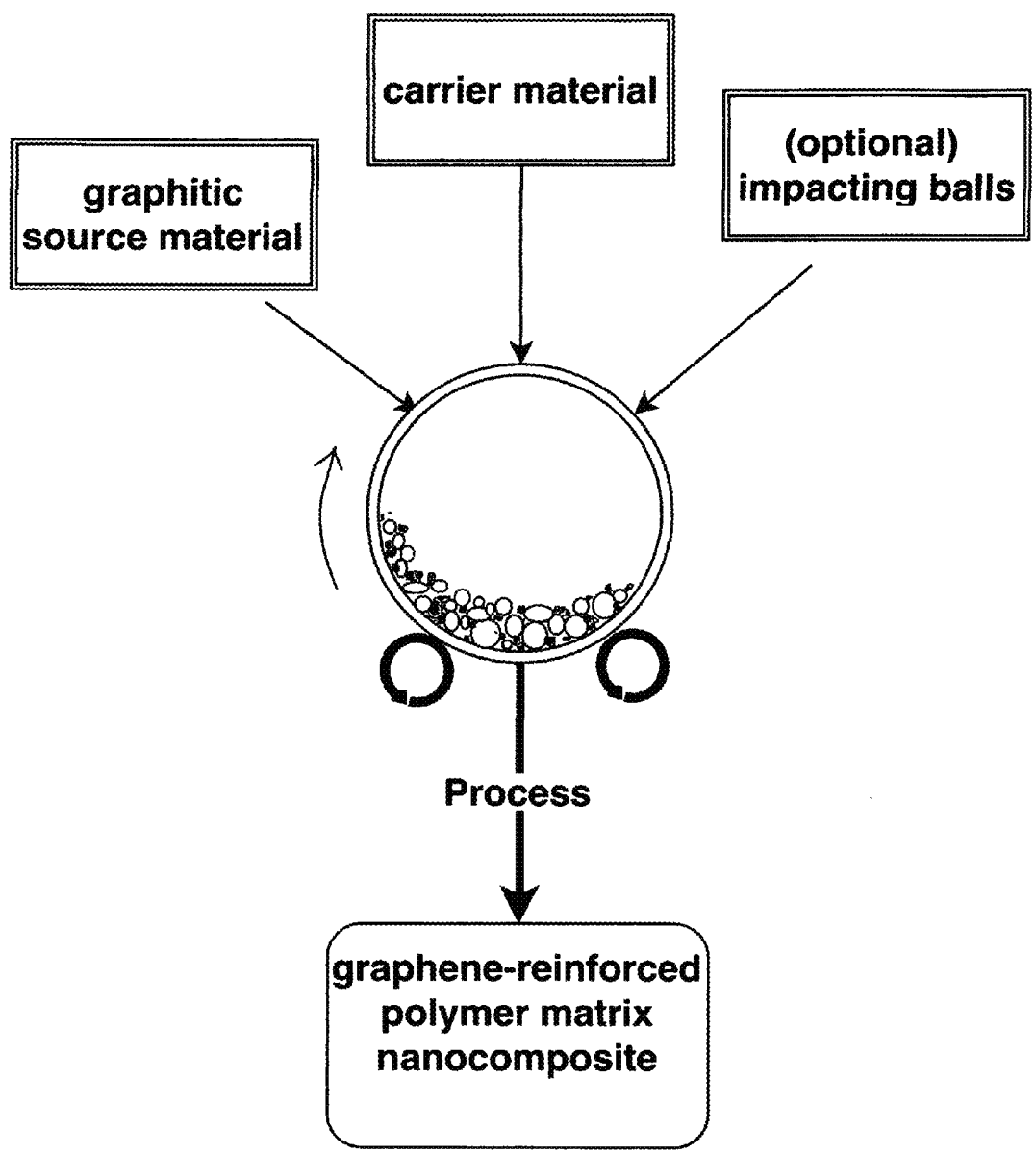
FIG. 2 A flow chart showing the presently invented process for producing graphene-reinforced polymer matrix composites via an energy impacting apparatus.

The present invention provides a strikingly simple, fast, scalable, environmentally benign, and cost-effective process that avoids essentially all of the drawbacks associated with prior art processes of producing graphene sheets, which are quickly transferred to particles of a desired polymer intended to become a matrix of a composite. As schematically illustrated in FIG. 2, one preferred embodiment of this method entails placing source graphitic material particles and particles of a solid polymer carrier material (plus optional impacting balls, if so desired) in an impacting chamber. After loading, the resulting mixture is immediately exposed to impacting energy, which is accomplished, for instance, by rotating the chamber to enable the impacting of the carrier particles (and optional impacting balls) against graphite particles. These repeated impacting events (occurring in high frequencies and high intensity) act to peel off graphene sheets from the surfaces of graphitic material particles and directly transfer these graphene sheets to the surfaces of polymer carrier particles (if no impacting balls are present) to form graphene-coated polymer particles. Some of the graphene platelets may become embedded into the polymer particles. This is a "direct transfer" process.

Alternatively, in the impacting chambers containing impacting balls (e.g. stainless steel or zirconia beads), graphene sheets are also peeled off by the impacting balls and tentatively transferred to the surfaces of impacting balls first. When the graphene-coated impacting balls impinge upon the polymer carrier material particles, the graphene sheets are transferred to surfaces of the polymer carrier material particles to form graphene-coated polymer particles. This is an "indirect transfer" process.

In less than two hours, most of the constituent graphene sheets of source graphite particles are peeled off, forming mostly single-layer graphene and few-layer graphene (mostly less than 5 layers). Following the direct or indirect transfer process (coating of graphene sheets on carrier material particles), the impacting balls (if present) or residual graphite particles (if present) are separated from the graphene-coated polymer particles using a broad array of methods. Separation or classification of graphene-coated polymer particles from impacting balls and residual graphite particles (if any) can be readily accomplished based on their differences in weight or density, particle sizes, magnetic properties, etc. The resulting graphene-coated polymer particles are already a "composite" or two-component material already; i.e. they are already "mixed". The two-component material is then thermally or solution-processed into a shape of composite material.

In other words, production of graphene sheets and mixing of graphene sheets with a polymer matrix are essentially accomplished concurrently in one operation. This is in stark contrast to the traditional processes of producing graphene sheets first and then subsequently mixing the graphene sheets with a polymer matrix in the conventional production of graphene-reinforced polymer matrix composite.

Figure 1:
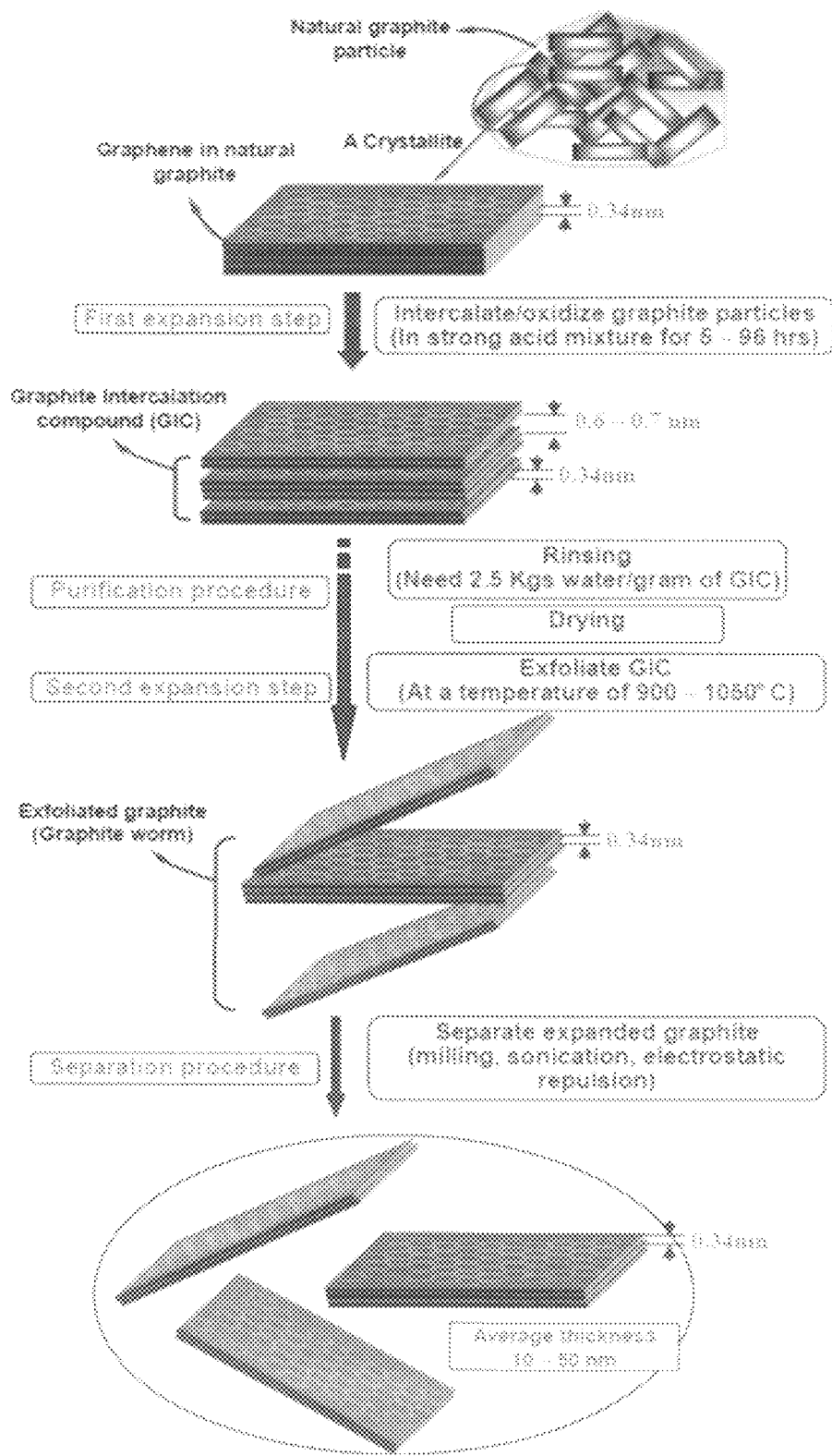
FIG. 1 A flow chart showing the most commonly used prior art process of producing highly oxidized NGPs that entails tedious chemical oxidation/intercalation, rinsing, and high-temperature exfoliation procedures.

In this conventional process, as shown in FIG. 1, the prior art chemical processes for producing graphene sheets or platelets alone typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets, as herein prepared) exhibit electrical conductivity values in the range of 1,500-4,500 S/cm. In contrast, the RGO paper prepared by the same paper-making procedure typically exhibits electrical conductivity values in the range of 100-1,000 S/cm.

In the conventional process of producing graphene-reinforced polymer matrix composite, graphene sheets produced must then be mixed with a polymer matrix to form into a composite according to one of the four approaches discussed earlier in the Background section: (1) In situ polymerization; (2) solution mixing; (3) dry blending; and (4) solid state shear pulverization to produce polymer/graphene nanocomposites.

Figure 3:
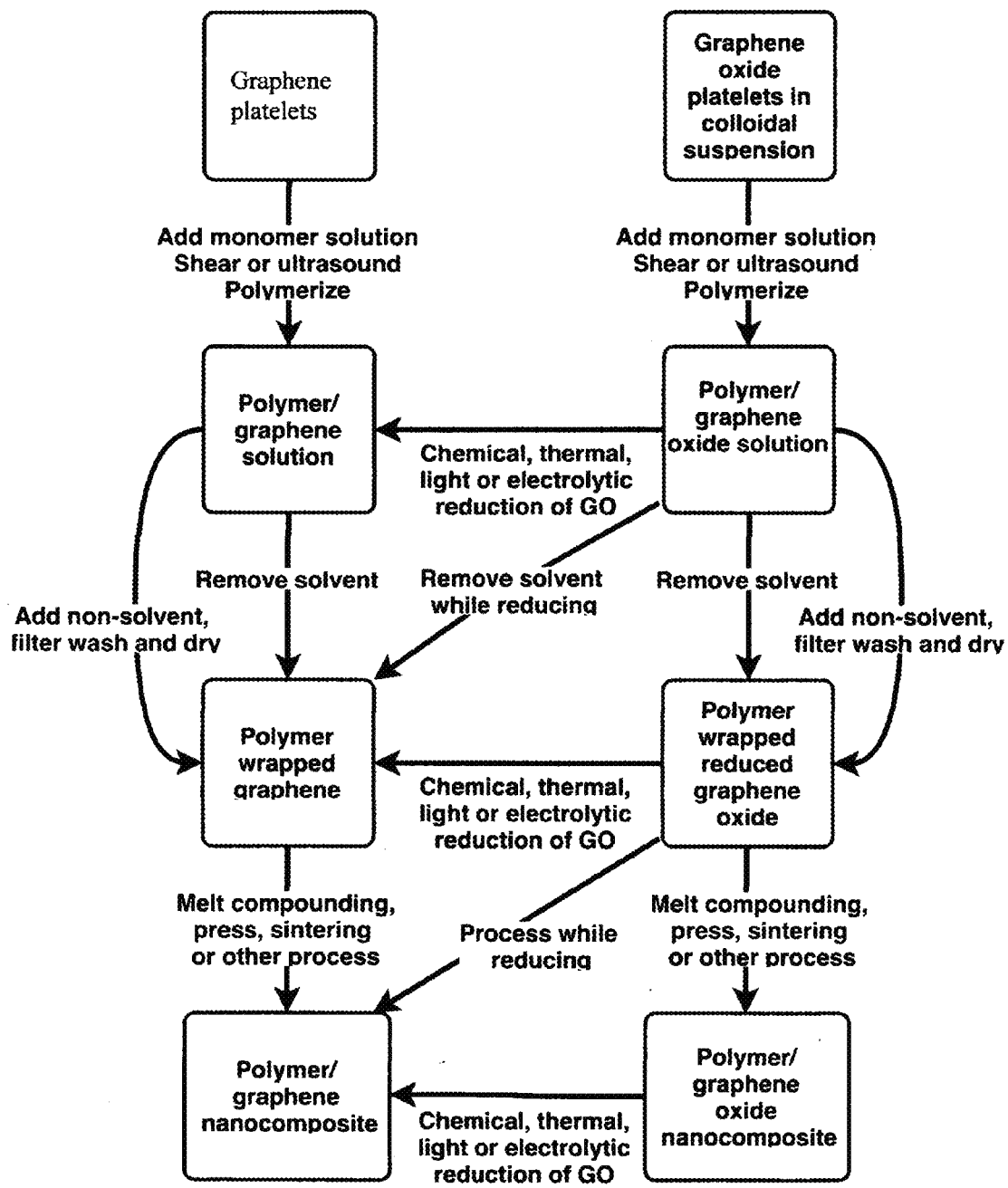
FIG. 3 A flow chart showing the commonly used prior art process of in situ polymerization to produce polymer/graphene and polymer/graphene oxide composites.

For instance, FIG. 3 shows a flow chart illustrating the commonly used prior art process of in situ polymerization to produce polymer/graphene and polymer/graphene oxide composites. In the most common process, previously produced graphene sheets or platelets are added to a monomer solution. Energy is applied via shear mixing or ultrasound to disperse graphene platelets or sheets in the monomer solution. The monomer is polymerized with the graphene platelets in situ, creating a solution of graphene wrapped polymer platelets. Solvent is then removed, or material is precipitated by adding a non-solvent, creating a graphene wrapped polymer that can be further processed. The same in situ process can be carried out with a suspension of graphene oxide as the starting material. With the graphene oxide process, reduction can take place at any of the process steps. Well known methods of reduction include chemical reduction, thermal reduction, light energy reduction and electrolytic reduction. The end result of the graphene oxide process is polymer/graphene oxide nanocomposite, or a polymer/graphene nanocomposite with partial or complete reduction. A mixture of graphene and graphene oxide is also a possible starting material.

The disadvantages of in situ polymerization are obvious—solvent usage and recovery; solvent hazards; identification of co-solvents for monomer, polymer and graphene; and (for graphene oxide) the possibility of damaging the polymer while reducing graphene oxide.

Figure 4:
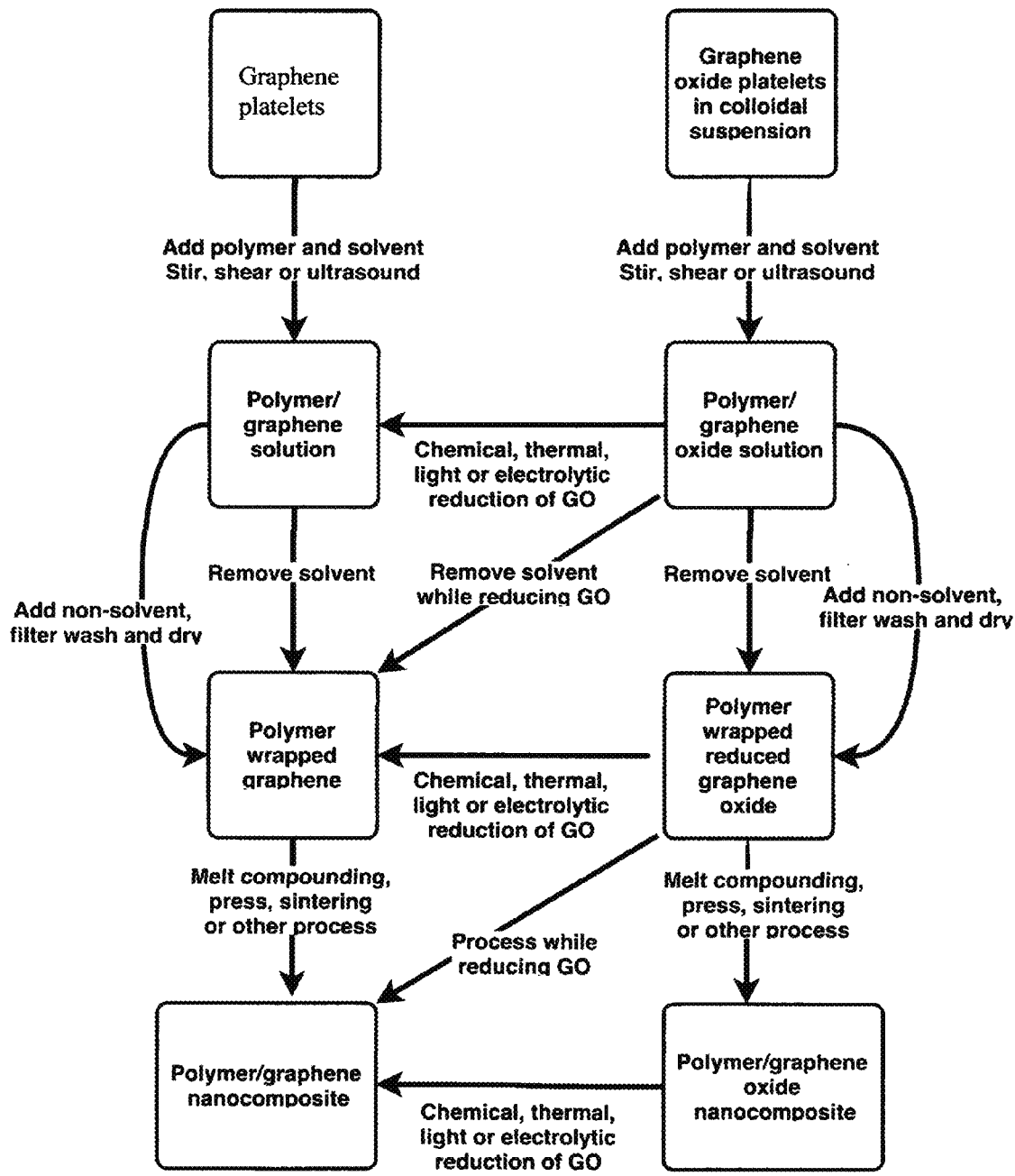
FIG. 4 A flow chart showing the commonly used prior art process of solution mixing to produce polymer/graphene and polymer/graphene oxide composites.

Shown in FIG. 4 is a commonly used prior art process of solution mixing. In the most common method, previously produced graphene platelets are added to polymer/solvent solution. Energy is applied by shear or ultrasound to fully disperse graphene sheets and dissolve the polymer, followed by a process to remove the solvent. One method for solvent removal involves adding a non-solvent to induce precipitation. The product, polymer-wrapped graphene platelets, is then further processed. A similar process can use graphene oxide as the starting material. The process steps can be modified to include reduction of the graphene oxide to graphene (reduced graphene oxide, RGO), if desired. A mixture of graphene and graphene oxide is also a possible starting material.

Figure 5:
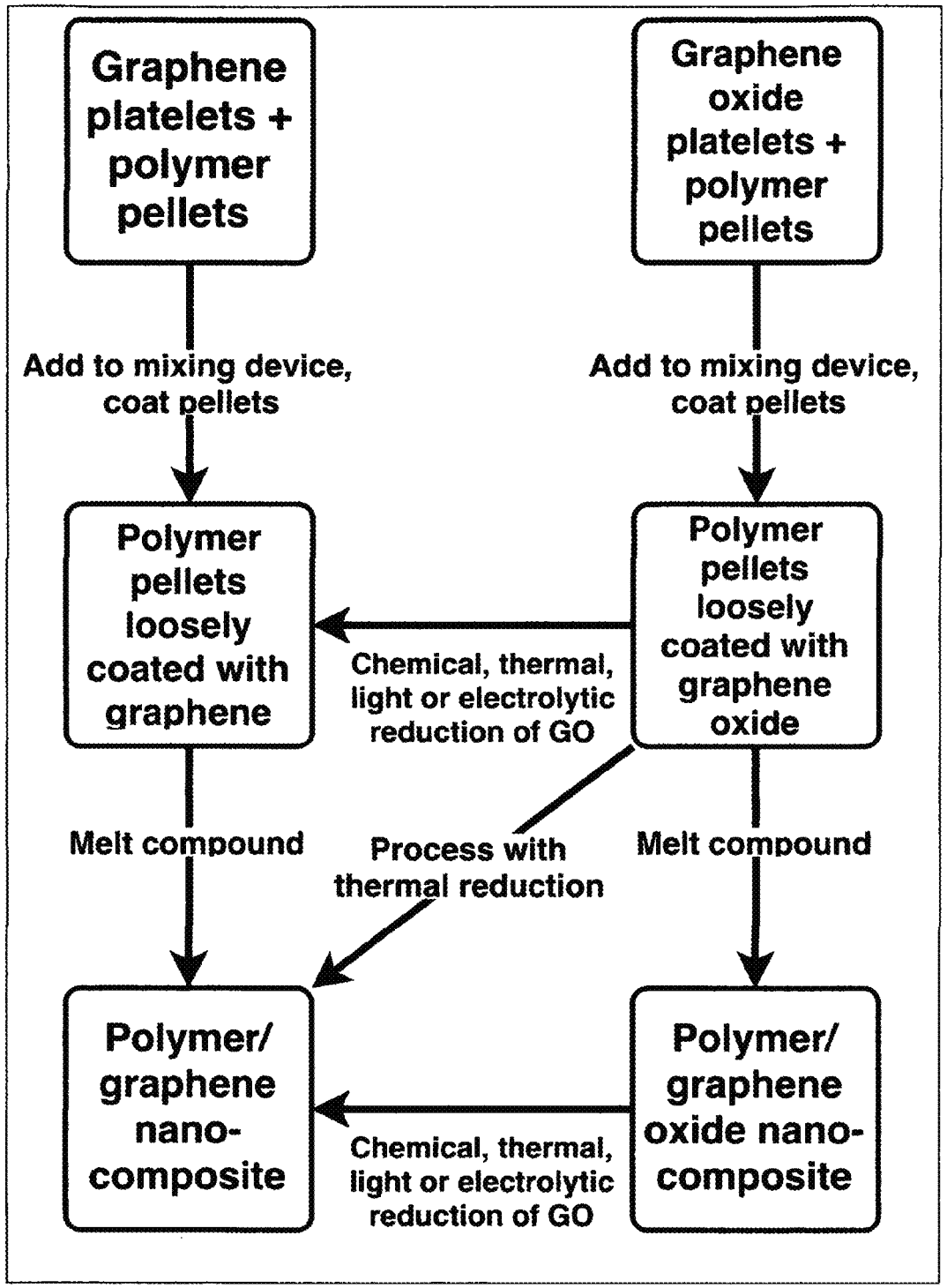
FIG. 5 A flow chart showing the commonly used prior art process of melt compounding to produce polymer/graphene and polymer/graphene oxide composites.

FIG. 5 shows the commonly used prior art process of melt compounding. In the most common process, previously produced graphene platelets are added to a mixing device and blended with polymer pellets. This graphene-polymer mixture is then melt-compounded (e.g. in an extruder) to create a polymer/graphene nanocomposite. Alternately, graphene oxide can be mixed with polymer pellets and subsequently melt-compounded.

In all these prior art processes for producing graphene-reinforced polymer matrix composite, graphene sheets must be exfoliated and separated first as a separate process. This is then followed by a blending or mixing process with a polymer or monomer. The resulting mixture is then formed into a composite shape via melting-solidification or solvent dissolution-solvent removal.

In contrast, the presently invented impacting process entails combining graphene production, functionalization (if desired), and graphene-polymer mixing in a single operation. This fast and environmentally benign process not only avoids significant chemical usage, but also produces a higher quality reinforcement material—pristine graphene as opposed to thermally reduced graphene oxide, as produced by the prior art process. Pristine graphene enables the creation of composite materials with higher electrical and thermal conductivity.

Although the mechanisms remain incompletely understood, this revolutionary process of the present invention appears to essentially eliminate the required functions of graphene plane expansion, intercalant penetration, exfoliation, and separation of graphene sheets and replace it with an entirely mechanical exfoliation process. The whole process can take less than 4 hours (typically 10 minutes to 2 hours), and can be done with no added chemicals. This is absolutely stunning, a shocking surprise to even those top scientists and engineers or those of extraordinary ability in the art.

Another surprising result of the present study is the observation that a wide variety of carbonaceous and graphitic materials can be directly processed without any particle size reduction or pre-treatment. This material may be selected from natural graphite, synthetic graphite, highly oriented pyrolytic graphite, meso-carbon micro-bead, graphite fiber, graphitic nano-fiber, graphite oxide, graphite fluoride, chemically modified graphite, exfoliated graphite, or a combination thereof. By contrast, graphitic material for used for the prior art chemical production and reduction of graphene oxide requires size reduction to 75 um or less average particle size. This process requires size reduction equipment (for example hammer mills or screening mills), energy input, and dust mitigation. By contrast, the energy impacting device method can accept almost any size of graphitic material. Starting material of several mm or cm in size or larger has been successfully processed to create graphene-coated or graphene-embedded polymer particles. The only size limitation is the chamber capacity of the energy impacting device; but this chamber can be very large (industry-scaled).

The presently invented process is capable of producing single-layer graphene sheets well-dispersed in a polymer matrix. In many examples, the graphene material produced contains at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content no less than 95% by weight, or functionalized graphene.

The presently invented process does not involve the production of GIC and, hence, does not require the exfoliation of GIC at a high exfoliation temperature (e.g. 800-1,100° C.). This is another major advantage from environmental protection perspective. The prior art processes require the preparation of dried GICs containing sulfuric acid and nitric acid intentionally implemented in the inter-graphene spaces and, hence, necessarily involve the decomposition of $H_2SO_4$ and $HNO_3$ to produce volatile gases (e.g. $NO_x$ and $SO_x$) that are highly regulated environmental hazards. The presently invented process completely obviates the need to decompose $H_2SO_4$ and $HNO_3$ and, hence, is environmentally benign. No undesirable gases are released into the atmosphere during the combined graphite expansion/exfoliation/separation process of the present invention.

One preferred embodiment of the present invention is the inclusion of impacting balls or media to the impacting chamber, as illustrated in FIG. 2. The impact media may contain balls of metal, glass, ceramic, or organic materials. The size of the impacting media may be in the range of 1 mm to 20 mm, or it may be larger or smaller. The shape of the impacting media may be spherical, needle like, cylindrical, conical, pyramidal, rectilinear, or other shapes. A combination of shapes and sizes may be selected. The size distribution may be unimodal Gaussian, bimodal or tri-modal.

Another preferred embodiment of this method is melt compounding of the graphene-coated or graphene-embedded particles to create graphene/polymer nanocomposites. The melted polymer-graphene (graphene sheets dispersed in a polymer matrix) can be extruded to create nanocomposite polymer pellets, sheets, rods, or fibers. As a unique application, the melted polymer, with graphene sheets dispersed therein, can be extruded to create continuous filaments for additive manufacturing (e.g. fused deposition modeling or FDM). The melted polymer may also be directly formed into a desired shape and solidified into a graphene-reinforced polymer matrix nanocomposite.

Another embodiment of this invention is melting the coated polymer particles to spin into a fiber form, spray into a powder form, or cast into an ingot. Another preferred embodiment of this method is heated pressing of the coated pellets with minimal added shear or mixing to directly form into a desired shape which is then solidified into a graphene-polymer composite.

Another preferred embodiment of this method is sintering of the coated pellets to directly form them into a desired shape. This sintering may be done with pressure to reduce void formation. Laser sintering of the coated polymer particles may be used to create near net shape articles in a selective laser sintering apparatus.

One significant advantage of the present invention as compared to prior art is flexibility of selecting carrier materials. A wide range of polymers can be processed with this process, into composites of various form factors, including pellets, powder, continuous filaments, and various shapes according to mold/tooling shapes.

Figure 6:
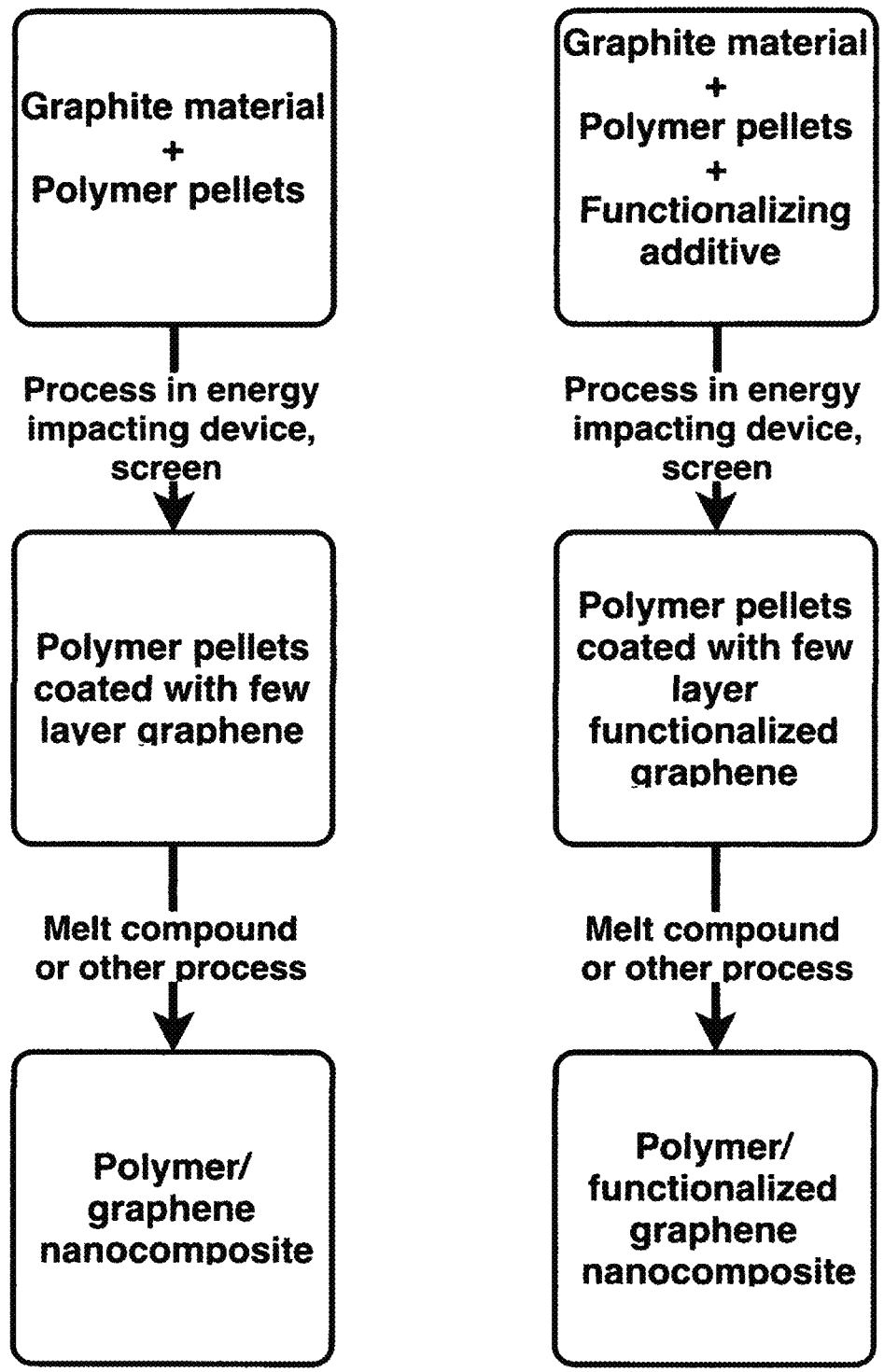
FIG. 6 A diagram showing the presently invented process for producing graphene-reinforced polymer matrix composites via an energy impacting apparatus.
Figure 7:
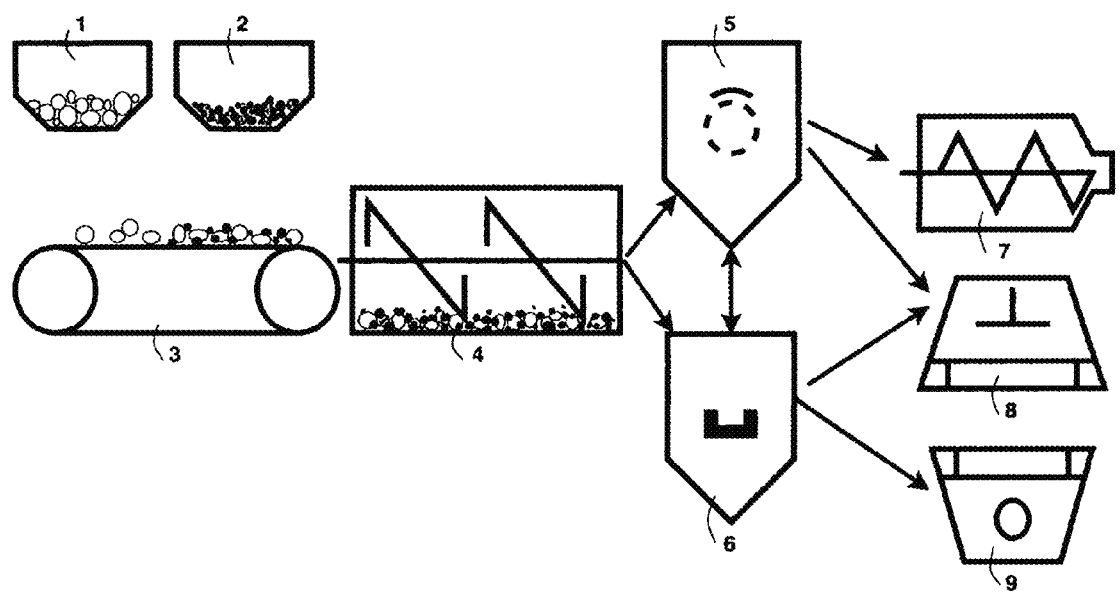
FIG. 7 A diagram showing the presently invented process for producing graphene-reinforced polymer matrix composites via a continuous ball mill.

In a desired embodiment, the presently invented method is carried out in an automated and/or continuous manner. For instance, as illustrated in FIG. 6 and FIG. 7, the mixture of graphite particles 1 and solid carrier particles 2 (plus optional impacting balls) is delivered by a conveyer belt 3 and fed into a continuous ball mill 4. After ball milling to form graphene-coated solid carrier particles, the product mixture (possibly also containing some residual graphite particles and optional impacting balls) is discharged from the ball mill apparatus 4 into a screening device (e.g. a rotary drum 5) to separate graphene-coated solid carrier particles from residual graphite particles (if any) and impacting balls (if any). This separation operation may be assisted by a magnetic separator 6 if the impacting balls are ferromagnetic (e.g. balls of Fe, Co, Ni, or Mn-based metal). The graphene-coated carrier particles may be delivered into a powder classifier, a cyclone, and or an electrostatic separator. The particles may be further processed by melt compounding 7, pressing 8, or grinding/pelletizing apparatus 9. These procedures can be fully automated. The process may include characterization or classification of the output material and recycling of insufficiently processed material into the continuous energy impacting device. The process may include weight monitoring of the load in the continuous energy impacting device to optimize material properties and throughput.

Another preferred embodiment of this invention is polymer dissolving in a solvent to form a polymer solution mixture with graphene sheets dispersed therein. The solution in then formed into a desired shape, for example by extruding into a mold. The solvent is then removed to create a graphene-reinforced polymer matrix composite. Another preferred embodiment of this method is dissolving of the coated polymer pellets and spraying them into a surface to create a graphene/polymer nanocomposite coating.

One significant advantage of the present invention as compared to prior art is flexibility of selecting the polymer carrier material. Virtually any polymer can be used as a solid carrier material to make graphene/polymer nanocomposites. Ground recycled plastic can be used without pelletizing or other melt processing. This reduces the thermal degradation experienced by the polymer, enabling higher improved mechanical properties.

Chemical Functionalization

Graphene sheets transferred to carrier solid particle surfaces have a significant proportion of surfaces that correspond to the edge planes of graphite crystals. The carbon atoms at the edge planes are reactive and must contain some heteroatom or group to satisfy carbon valency. There are many types of functional groups (e.g. hydroxyl and carboxylic) that are naturally present at the edge or surface of graphene nano platelets produced through transfer to a solid carrier particle. The impact-induced kinetic energy experienced by the carrier particles are of sufficient energy and intensity to chemically activate the edges and even surfaces of graphene sheets coated on carrier particle surfaces (e.g. creating highly active sites or free radicals). Provided that certain chemical species containing desired chemical function groups (e.g. $—NH_2$, Br—, etc.) are included in the impacting chamber, these functional groups can be imparted to graphene edges and/or surfaces. In other words, production and chemical functionalization of graphene sheets can be accomplished concurrently by including appropriate chemical compounds in the impacting chamber. In summary, a major advantage of the present invention over other processes is the simplicity of simultaneous production and modification of surface chemistry.

Graphene platelets derived by this process may be functionalized through the inclusion of various chemical species in the impacting chamber. In each group of chemical species discussed below, we selected 2 or 3 chemical species for functionalization studies.

In one preferred group of chemical agents, the resulting functionalized NGP may broadly have the following formula(e): [NGP]—$R_m$, wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, Si(—O—)$_y$R'$_{3-y}$, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

For NGPs to be effective reinforcement fillers in epoxy resin, the functional group $—NH_2$ is of particular interest.

For example, a commonly used curing agent for epoxy resin is diethylenetriamine (DETA), which has three —NH$_2$ groups. If DETA is included in the impacting chamber, one of the three —NH$_2$ groups may be bonded to the edge or surface of a graphene sheet and the remaining two unreacted —NH$_2$ groups will be available for reacting with epoxy resin. Such an arrangement provides a good interfacial bonding between the NGP (graphene sheets) and the matrix of a composite material.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin material at one or two other ends.

Alternatively, the functionalizing agent contains an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

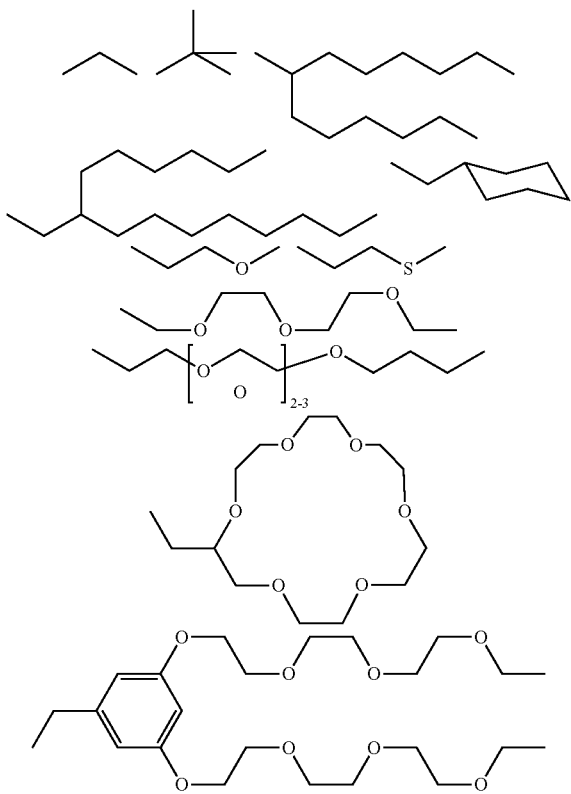

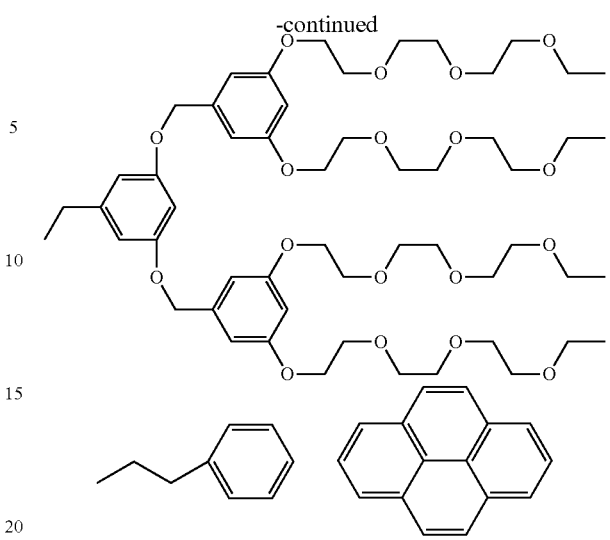

and combinations thereof.

The above-described [NGP]—R$_m$ may be further functionalized. This can be conducted by opening up the lid of an impacting chamber after the —R$_m$ groups have been attached to graphene sheets and then adding the new functionalizing agents to the impacting chamber and resuming the impacting operation. The resulting graphene sheets or platelets include compositions of the formula: [NGP]-A$_m$, where A is selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R'', R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

The NGPs may also be functionalized to produce compositions having the formula: [NGP]—[R'-A]$_m$, where m, R' and A are as defined above. The compositions of the invention also include NGPs upon which certain cyclic compounds are adsorbed. These include compositions of matter of the formula: [NGP]—[X—R$_a$]$_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]—[X-A$_a$]$_m$, where m, a, X and A are as defined above.

The functionalized NGPs of the instant invention can be prepared by sulfonation, electrophilic addition to deoxygenated platelet surfaces, or metalation. The graphitic platelets can be processed prior to being contacted with a functionalizing agent. Such processing may include dispersing the platelets in a solvent. In some instances the platelets may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 96, 1839 (1965), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

The following examples serve to provide the best modes of practice for the present invention and should not be construed as limiting the scope of the invention:

Example 1: NGP (Graphene Sheets) from Flake Graphite Via Polypropylene Powder-Based Carrier In an experiment, 1 kg of polypropylene (PP) pellets, 50 grams of flake graphite, 50 mesh (average particle size 0.18 mm; Asbury Carbons, Asbury N.J.) and 250 grams of magnetic stainless steel pins (Raytech Industries, Middletown Conn.) were placed in a high-energy ball mill container. The ball mill was operated at 300 rpm for 4 hours. The container lid was removed and stainless steel pins were removed via a magnet. The polymer carrier material was found to be coated with a dark carbon layer. Carrier material was placed over a 50 mesh sieve and a small amount of unprocessed flake graphite was removed. A sample of the coated carrier material was then placed in a crucible in a vented furnace at 600° C. After cooling down, the furnace was opened to reveal a crucible full of isolated graphene sheet powder. The remaining coated carrier material was then melt compounded, pelletized, and injection molded to create tensile test bars.

In a separate experiment, the same batch of PP pellets and flake graphite particles (without the impacting steel particles) were placed in the same type high-energy ball mill container and the ball mill was operated under the same conditions for the same period of time. The results were compared with those obtained from impacting ball-assisted operation.

Although polypropylene (PP) is herein used as an example, the carrier material for graphene reinforced polymer matrix composite materials is not limited to PP. It could be any polymer (thermoplastic, thermoset, rubber, wax, mastic, gum, organic resin, etc.) provided the polymer can be made into a particulate form. It may be noted that un-cured or partially cured thermosetting resins (such as epoxide and imide-based oligomers or rubber) can be made into a particle form at room temperature or lower (e.g. cryogenic temperature).

Example 2: NGP from Expanded Graphite (>100 nm in Thickness) Via ABS Polymer In an experiment, 100 grams of ABS pellets, as solid carrier material particles, were placed in a 16 oz plastic container along with 5 grams of expanded graphite. This container was placed in an acoustic mixing unit (Resodyn Acoustic mixer) and processed for 30 minutes. After processing, carrier material was found to be coated with a thin layer of carbon. A small sample of carrier material was placed in acetone and subjected to ultrasound energy to speed dissolution of the ABS. The solution was filtered using an appropriate filter and washed four times with additional acetone. Subsequent to washing, filtrate was dried in a vacuum oven set at 60° C. for 2 hours. This sample was examined by optical microscopy and found to be graphene. The remaining pellets were extruded to create a 1.75 mm filament used for fused filament fabrication

Example 3: Functionalized Graphene from Meso-Carbon Micro Beads (MCMBs) Via PLA In one example, 100 grams of PLA pellets (carrier material) and 2 grams of MCMBs (China Steel Chemical Co., Taiwan) were placed in a vibratory ball mill, which also contains particles of magnetic stainless steel impactor and processed for 2 hours. Subsequently, DETA was added and the material mixture was processed for an additional 2 hours. After the process was completed, the vibratory mill was then opened and the carrier material was found to be coated with a dark coating of graphene. The magnetic steel particles were removed with a magnet. The carrier material subsequently ground and sintered using a selective laser sintering apparatus.

In separate experiments, the following functional group-containing species were introduced to the graphene sheets produced: an amino acid, sulfonate group ($-SO_3H$), 2-Azidoethanol, caprolactam, and aldehydic group. In general, these functional groups were found to impart significantly improved interfacial bonding between resulting graphene sheets and epoxy, polyester, polyimide, polyamide, and vinyl ester matrix materials to make stronger polymer matrix composites. The interfacial bonding strength was semi-quantitatively determined by using a combination of short beam shear test and fracture surface examination via scanning electronic microscopy (SEM). Non-functionalized graphene sheets tend to protrude out of the fractured surface without any residual matrix resin being attached to graphene sheet surfaces. In contrast, the fractured surface of composite samples containing functionalized graphene sheets do not exhibit any bare graphene sheets; and what appears to be graphene sheets were completely embedded in a resin matrix.

Example 4: ABS Composite Via Freezer Mill

In one experiment, 10 grams of ABS pellets were placed in a SPEX mill sample holder (SPEX Sample Prep, Metuchen, N.J.) along with 0.25 grams of HOPG derived from graphitized polyimide and a magnetic stainless steel impactor. This process was carried out in a 1% "dry room" to reduce the condensation of water onto the completed product. The SPEX mill was operated for 10 minutes. After operation, the contents of the sample holder were transferred to an acetone bath. An ultrasound horn was operated for 15 minutes to dissolve the ABS carrier. The resulting solution was sprayed onto a metal substrate, creating a graphene/polymer composite coating.

Figure 8A:
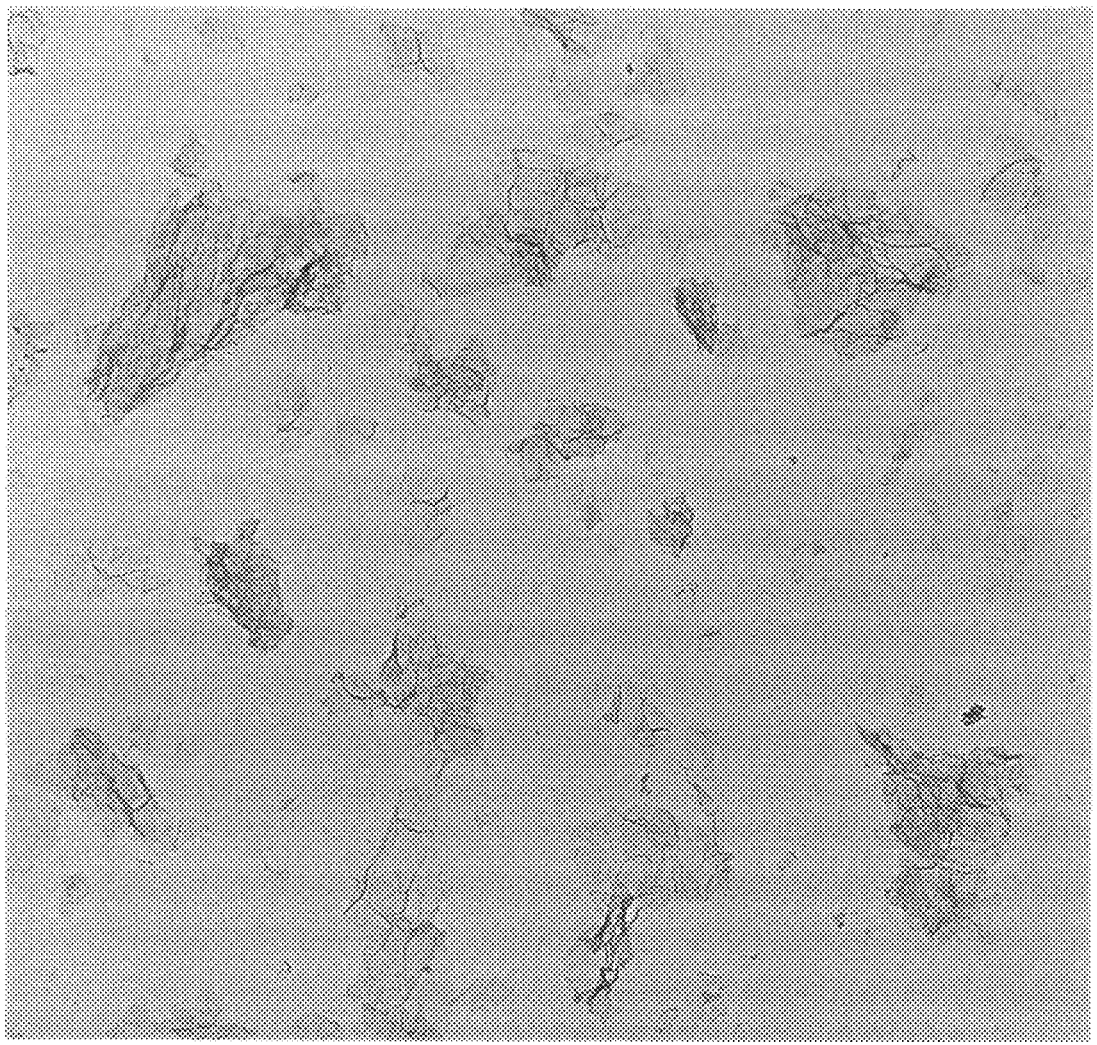
FIG. 8(A) Transmission electron micrograph of graphene sheets produced by conventional Hummer's route (much smaller graphene sheets, but comparable thickness).
Figure 8B:
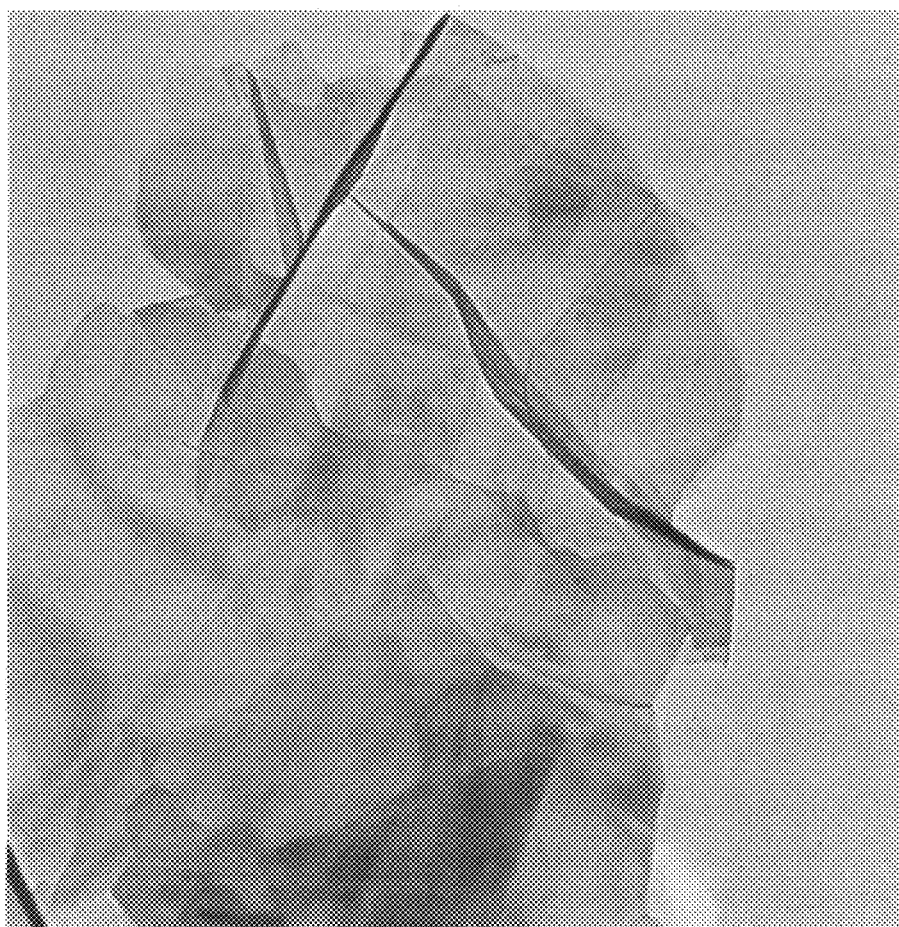
FIG. 8(B) Transmission electron micrograph of graphene sheets produced by the presently invented impact energy method.

Example 5: NGP from Natural Graphite Particles Via Polyethylene (PE) and Nylon 6/6 Beads and Ceramic Impacting Balls or Glass Beads In an experiment, 0.5 kg of PE or nylon beads (as a solid carrier material), 50 grams of natural graphite (source of graphene sheets) and 250 grams of zirconia powder (impacting balls) were placed in containers of a planetary ball mill. The ball mill was operated at 300 rpm for 4 hours. The container lid was removed and zirconia beads (different sizes and weights than graphene-coated PE beads) were removed through a vibratory screen. The polymer carrier material was found to be coated with a dark graphene layer. Carrier material was placed over a 50 mesh sieve and a small amount of unprocessed flake graphite was removed. A sample of the coated carrier material was then placed in a crucible in a vented furnace at 600° C. After cooling down, the furnace was opened to reveal a crucible full of isolated graphene sheet powder (>95% single-layer graphene), as shown in FIG. 8(B). The remaining graphene-coated PE or nylon beads were separately melt-compounded and injection molded to create flexural test bars and discs for electrical conductivity measurements. In a separate experiment, glass beads were used as the impacting balls; other ball-milling operation conditions remained the same.

Comparative Example 1: Graphene Via Hummer's Process and Polymer Composite

Graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å). A sample of this material was subsequently transferred to a furnace pre-set at 650° C. for 4 minutes for exfoliation and heated in an inert atmosphere furnace at 1200° C. for 4 hours to create a low density powder comprised of few layer reduced graphene oxide (RGO), as shown in FIG. 8(A). Surface area was measured via nitrogen adsorption BET.

This material was then transferred to a furnace pre-set at 650° C. for 4 minutes to for exfoliation and then heated in an inert atmosphere furnace at 1200° C. for 4 hours to create a low density powder comprised of few layer graphene. This powder was subsequently dry mixed at a 1%-25% loading level with ABS, PE, PP, and nylon pellets, respectively, and compounded using a 25 mm twin screw extruder.

Example 6: Summary of Testing Results

Scanning electron microscopy (SEM), transmission electron microscopy (TEM), Raman spectroscopy, flexural strength test (both long beam test for flexural strength and modulus determination and short beam shear test for interlaminar or interfacial bonding assessment), BET test for determination of specific surface area (SSA), electrical conductivity (4-point probe) test, and thermal conductivity (laser flash) test were conducted to measure structure and properties of both polymer matrix composites and the matrix-free isolated graphene sheets recovered after all-milling. The following are a summary of some of the more significant results:

1) In general, the addition of impacting balls helps to accelerate the process of peeling off graphene sheets from graphite particles. However, this option necessitates the separation of these impacting balls after graphene-coated polymer particles are made.
2) When no impacting particles (ceramic, glass, metal balls, etc.) are used, harder polymer particles (e.g. PE, PP, nylon, ABS, polystyrene, high impact polystyrene, etc. and their filler-reinforced versions) are more capable of peeling off graphene sheets from graphite particles, as compared to soft polymer particles (e.g. rubber, PVC, polyvinyl alcohol, latex particles).
3) Without externally added impacting balls, softer polymer particles tend to result in graphene-coated or embedded particles having 0.01% to 5% by weight of graphene (mostly single-layer graphene sheets) and harder polymer balls tend to lead to graphene-coated particles having 0.1% to 30% by weight of graphene (mostly single-layer and few layer graphene sheets).
4) With externally added impacting balls, all polymer balls are capable of supporting from 0.01% to approximately 80% by weight of graphene sheets (mostly few-layer graphene, <10 layers if over 30% by weight).
5) The graphene-reinforced polymer matrix composites (graphene/polymer nanocomposites) produced by the presently invented method typically exhibit a significantly higher flexural strength as compared to their counterparts produced by the conventional, prior art methods. SEM examination of fractures surfaces reveals much more uniform dispersion of graphene in the presently invented graphene/polymer nanocomposites. Agglomeration of nano-fillers can be sources of crack initiation in a composite material.
6) The graphene/polymer nanocomposites produced by the presently invented method also have a significantly lower percolation threshold. The percolation threshold is the critical volume fraction or weight fraction of a conducting filler that enables the formation of a network of electron-conducting paths in an otherwise non-conducting polymer matrix. This is typically characterized by a sudden jump, by 1-5 orders of magnitude, in an electrical conductivity-vs.-filler fraction curve. For instance, the presently invented graphene/ABS nanocomposites can exhibit a percolation threshold as low as 0.3%, but the same type of composites require approximately 2.5% by weight of graphene sheets to achieve the percolation threshold
7) The graphene/polymer nanocomposites containing chemically functionalized graphene sheets exhibit a significantly higher short-beam shear strength as compared with those containing non-functionalized graphene sheets. This demonstrates the surprising effectiveness of the presently invented method of combined graphene production/functionalization.

The invention claimed is:

1. A method of producing a graphene-reinforced polymer matrix composite directly from a graphitic material, said method comprising: (a) mixing multiple particles of a graphitic material and multiple particles of a solid polymer carrier material to form a mixture in an impacting chamber of an energy impacting apparatus, wherein said impacting chamber does not contain an impacting ball and wherein the energy impacting apparatus is a vibratory ball mill, planetary ball mill, high energy mill, basket mill, agitator ball mill, cryo ball mill, micro ball mill, tumbler ball mill, continuous ball mill, stirred ball mill, pressurized ball mill, freezer mill, vibratory sieve, bead mill, nano bead mill, ultrasonic homogenizer mill, centrifugal planetary mixer, vacuum ball mill, or resonant acoustic mixer; and (b) operating said energy impacting apparatus with a frequency and an intensity for a length of time sufficient for peeling off graphene sheets from said graphitic material and transferring said graphene sheets to surfaces of said solid polymer carrier material particles to produce graphene-coated or graphene-embedded polymer particles inside said impacting chamber, and recovering said graphene-coated or graphene-embedded polymer particles from said impacting chamber, wherein said solid polymer carrier material has a thickness or diameter greater than 1 μm.

2. The method of claim 1, further comprising a step (c) of forming said graphene-coated or graphene-embedded polymer particles into a graphene-reinforced polymer matrix composite.

3. The method of claim 1, wherein said solid polymer material particles include plastic or rubber beads, pellets, spheres, wires, fibers, filaments, discs, ribbons, or rods, having a diameter or thickness less than 10 mm.

4. The method of claim 3, wherein said diameter or thickness is less than 100 μm.

5. The method of claim 1, wherein said solid polymer carrier material includes micron- or nanometer-scaled particles that can be dissolved in a solvent or melted above a melting temperature, and said method includes a step of dissolving or melting said solid polymer carrier material for forming said polymer matrix composites.

6. The method of claim 1 wherein said graphitic material is selected from natural graphite, synthetic graphite, highly oriented pyrolytic graphite, graphite fiber, graphitic nano-fiber, graphite fluoride, oxidized graphite, chemically modified graphite, exfoliated graphite, recompressed exfoliated graphite, expanded graphite, meso-carbon micro-bead, or a combination thereof.

7. The method of claim 1, wherein said graphitic material contains a non-intercalated and non-oxidized graphitic material that has never been previously exposed to a chemical or oxidation treatment prior to said mixing step.

8. The method of claim 2, wherein said step (c) includes melting said polymer particles to form a polymer melt mixture with graphene sheets dispersed therein, forming said polymer melt mixture into a desired shape and solidifying said shape into said graphene-reinforced polymer matrix composite.

9. The method of claim 2, wherein said step (c) includes dissolving said polymer particles in a solvent to form a polymer solution mixture with graphene sheets dispersed therein, forming said polymer solution mixture into a desired shape, and removing said solvent to solidify said shape into said graphene-reinforced polymer matrix composite.

10. The method of claim 2, wherein said step (c) includes melting said polymer particles to form a polymer melt mixture with graphene sheets dispersed therein and extruding said mixture into a rod form or sheet form, spinning said mixture into a fiber form, spraying said mixture into a powder form, or casting said mixture into an ingot form.

11. The method of claim 2, wherein said step (c) includes dissolving said polymer particles in a solvent to form a polymer solution mixture with graphene sheets dispersed therein and extruding said solution mixture into a rod form or sheet form, spinning said solution mixture into a fiber form, spraying said solution mixture into a powder form, or casting said solution mixture into an ingot form, and removing said solvent.

12. The method of claim 11, wherein said polymer solution mixture is sprayed to create a nano graphene reinforced polymer matrix composite coating.

13. The method of claim 2, wherein said step (c) includes sintering said graphene-coated polymer particles into a desired shape of said graphene-reinforced polymer matrix composite, wherein said sintering occurs in a selective laser sintering apparatus.

14. The method of claim 1 wherein said graphene sheets contain single-layer graphene sheets.

15. The method of claim 1 wherein said graphene sheets contain at least 80% single-layer graphene or at least 80% few-layer graphene having no greater than 10 graphene planes.

16. The method of claim 1 wherein said graphene sheets contain pristine graphene, oxidized graphene with less than 5% oxygen content by weight, graphene fluoride, graphene fluoride with less than 5% fluorine by weight, graphene with a carbon content no less than 95% by weight, or chemically modified graphene.

17. The method of claim 1 wherein said impacting chamber further contains a modifier filler selected from a carbon fiber, ceramic fiber, glass fiber, carbon nanotube, carbon nano-fiber, metal nano wire, metal particle, ceramic particle, glass powder, carbon particle, graphite particle, organic particle, or a combination thereof.

18. The method of claim 1 wherein said polymer is selected from a thermoplastic polymer, thermosetting resin, rubber or elastomer, semi-penetrating network polymer, penetrating network polymer, wax, gum, mastic or a combination thereof.

19. The method of claim 1 wherein said impacting chamber further contains a functionalizing agent and said step (b) of operating said energy impacting apparatus act to chemically functionalize said graphene sheets with said functionalizing agent.

20. The method of claim 19 wherein said functionalizing agent contains a chemical functional group selected from alkyl or aryl silane, alkyl or aralkyl group, hydroxyl group, carboxyl group, amine group, sulfonate group (—SO$_3$H), aldehydic group, quinoidal, fluorocarbon, or a combination thereof.

21. The method of claim 19 wherein said functionalizing agent contains an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups, and combinations thereof.

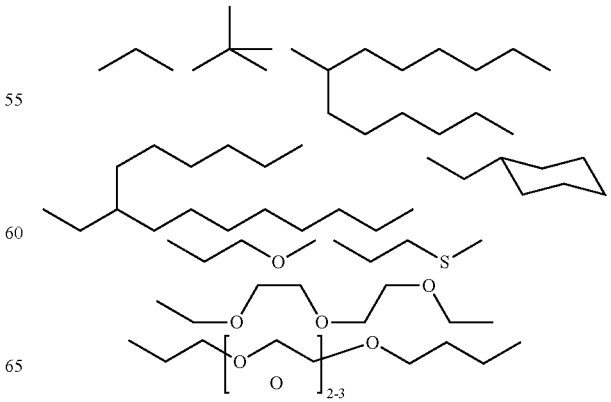

-continued

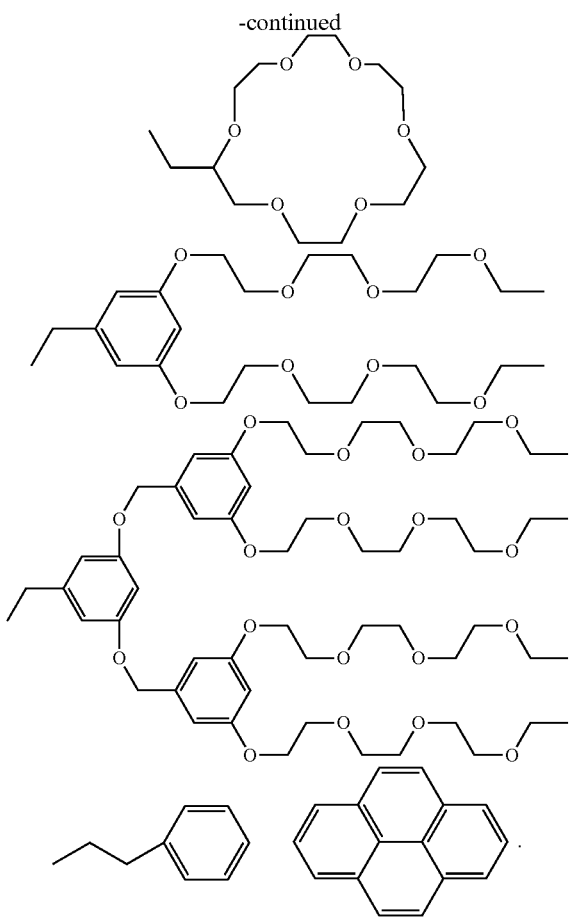

22. The method of claim 19 wherein said functionalizing agent contains an oxygenated group selected from the group consisting of hydroxyl, peroxide, ether, keto, and aldehyde.

23. The method of claim 19 wherein said functionalizing agent contains a functional group selected from the group consisting of $SO_3H$, COOH, $NH_2$, OH, R'CHOH, CHO, CN, COCl, halide, COSH, SH, COOR', SR', SiR'$_3$, Si(—OR'—)$_y$R'$_3$-y, Si(—O—SiR'$_2$—)OR', R'', Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, and combinations thereof.

24. The method of claim 19 wherein said functionalizing agent contains a functional group is selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

25. The method of claim 19 wherein said functionalizing agent contains a functional group selected from OY, NHY, O═C—OY, P═C—NR'Y, O═C—SY, O═C—Y, —CR'१-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—O—SiR'$_2$—) OR', R'—R'', R'—N—CO, ($C_2H_4O$—)$_w$H, (—$C_3H_6O$)$_w$H, (—$C_2H_4O$)$_w$—R', ($C_3H_6O$)$_w$—R', and R' where R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and w is an integer greater than one and less than 200, wherein y is an integer equal to or less than 3.

26. The method of claim 2, wherein said step of operating said energy impacting apparatus is conducted in a continuous manner using a continuous energy impacting device.

* * * * *

UNITED STATES PATENT AND TRADEMARK OFFICE
CERTIFICATE OF CORRECTION

PATENT NO.      : 9,926,427 B2
APPLICATION NO. : 14/757236
DATED           : March 27, 2018
INVENTOR(S)     : Zhamu et al.

Page 1 of 2

It is certified that error appears in the above-identified patent and that said Letters Patent is hereby corrected as shown below:

In the Claims

Column 26, Claim 21, Line 42, thru Column 27, Line 35, should read as follows:
21. The method of claim 19 wherein said functionalizing agent contains an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R = any one of the following groups, and combinations thereof.

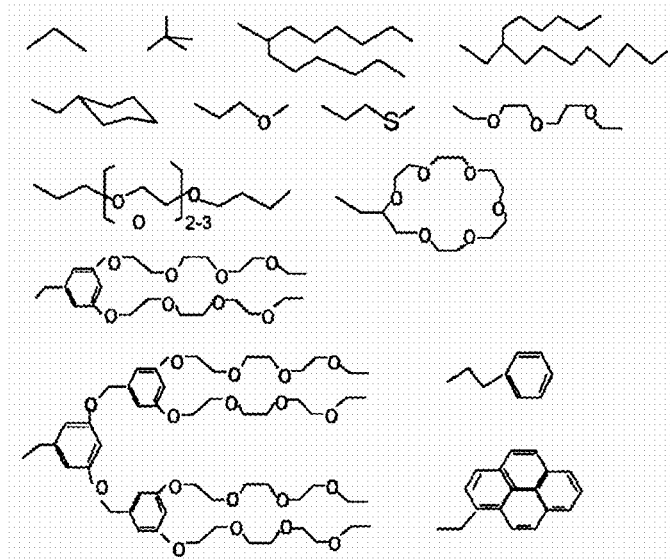

Column 28, Claim 25, Line 20, should read as follows:
25. The method of claim 19 wherein said functionalizing agent contains a functional group selected from OY, NHY, O=C--OY, P=C--NR'Y, O=C--SY, O=C--Y, --CR'1--OY, N'Y or C'Y, and Signed and Sealed this
Eighth Day of May, 2018

Andrei Iancu
*Director of the United States Patent and Trademark Office*

CERTIFICATE OF CORRECTION (continued)
U.S. Pat. No. 9,926,427 B2

Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from $R'-OH$, $R'-NR'_2$, $R'SH$, $R'CHO$, $R'CN$, $R'X$, $R'N^+(R')_3X^-$, $R'SiR'_3$, $R'Si(-OR'-)_yR'_{3-y}$, $R'Si(-O-SiR'_2-)OR'$, $R'-R''$, $R'-N-CO$, $(C_2H_4O-)_wH$, $(-C_3H_6O-)_wH$, $(-C_2H_4O)_w-R'$, $(C_3H_6O)_w-R'$, and $R'$ where $R'$ is hydrogen, alkyl, aryl, cycloalkyl, or aralkyl, cycloaryl, or poly(alkylether), $R''$ is fluoroalkyl, fluoroaryl, fluorocycloalkyl, fluoroaralkyl or cycloaryl, X is halide, and w is an integer greater than one and less than 200, wherein y is an integer equal to or less than 3.